July 24, 1923.

G. W. BINGHAM 1,462,784

MOTION PICTURE DEVICE

Filed Feb. 11, 1921

G. W. BINGHAM

MOTION PICTURE DEVICE

Filed Feb. 11, 1921

INVENTOR.
George W. Bingham
BY
Horace Freeman
his ATTORNEY.

July 24, 1923.

G. W. BINGHAM 1,462,784

MOTION PICTURE DEVICE

Filed Feb. 11, 1921

George W. Bingham INVENTOR.

BY

Horace Pennington

ATTORNEY.

Patented July 24, 1923.

1,462,784

UNITED STATES PATENT OFFICE.

GEORGE W. BINGHAM, OF NEWARK, NEW JERSEY, ASSIGNOR TO WIDESCOPE CAMERA CO., OF NEWARK, NEW JERSEY, A CORPORATION OF NEW JERSEY.

MOTION-PICTURE DEVICE.

Application filed February 11, 1921. Serial No. 444,101.

*To all whom it may concern:*

Be it known that I, GEORGE W. BINGHAM, a citizen of the United States, residing in Newark, in the county of Essex and State of New Jersey, have invented certain new and useful Improvements in Motion-Picture Devices, of which the following is a full, clear, and exact specification.

My invention relates to motion picture devices and refers particularly to extended field cameras.

One object of my invention is a device capable of photographing motion pictures over an extended area of vision.

Another object of my invention is a device whereby an extended field of vision may be photographed upon a film by a series of lenses.

Another object of my invention is a device whereby a series of moving objects may be photographed simultaneously upon a film to produce an extended field view.

These and other objects of my invention will be evident upon a consideration of my drawings, specification and claims.

In the ordinary motion picture camera but one lens is used, the angle of vision, therefore, being limited to the angular extent of the lens. This renders it impossible for the camera to have an extended field of vision, unless it is a very considerable distance from the photographical object, a position which it is frequently impossible to obtain.

The device of my invention accomplishes these, and other, desirable results in an effective and positive manner.

In a broad way, my camera contains a plurality of photographic lenses so arranged that their optical centers are in vertical alignment with each other and at such angles with respect to each other that a plurality of abutting views may be simultaneously photographed in stepped relationship with respect to each other upon a single film.

My invention includes new and operative means for accomplishing the above and other desirable and valuable objects, my device, therefore, presenting a means whereby an extended view may be photographed in a series of pictures upon a single film, the pictures thus impressed being in stepped relationship with respect to each other and capable of being projected upon a screen to produce a continuous extended picture of the combined pictures thus obtained.

In the accompanying drawings illustrating one form of the device of my invention, similar parts are designated by similar numerals.

Figure 1:
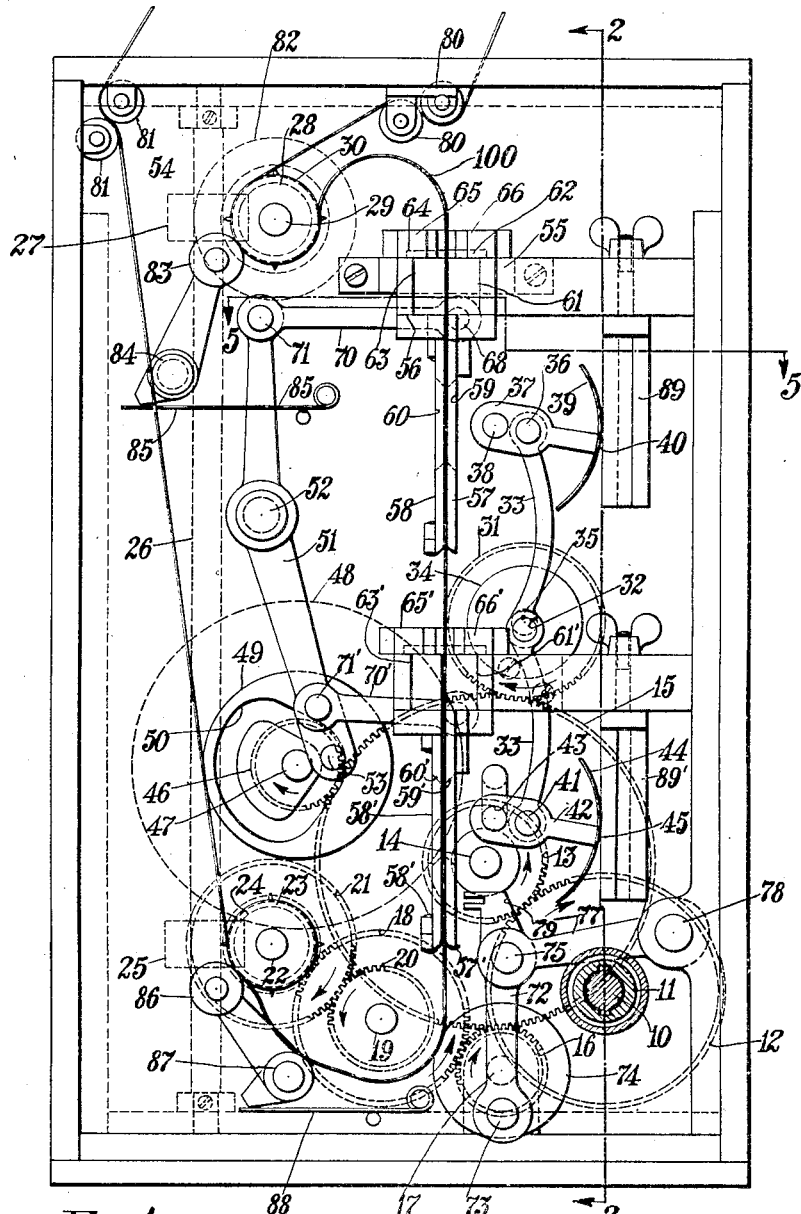
Figure 1 is a side elevation of one form of my device.
Figure 2:
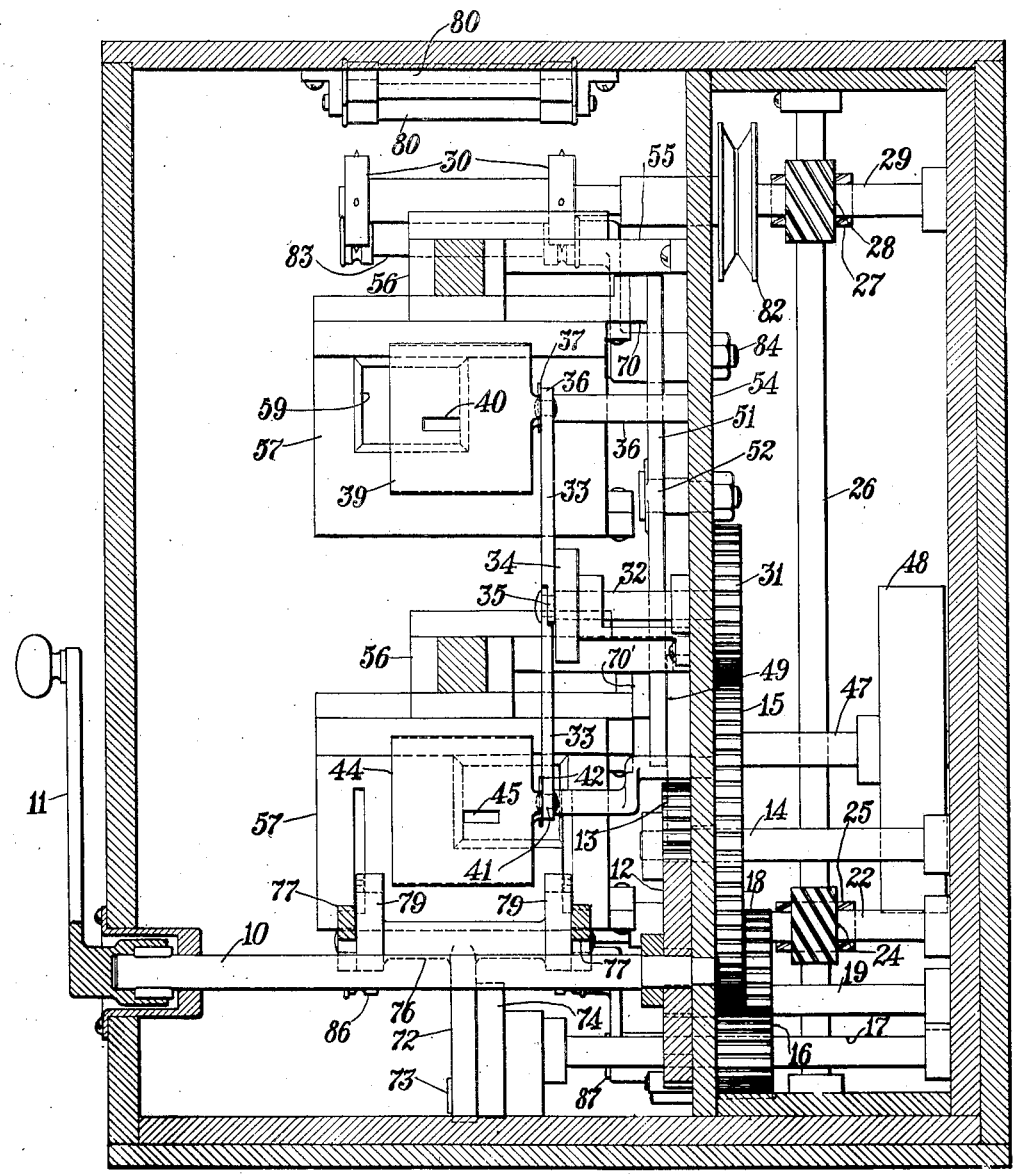
Figure 2 is a section through the line 2—2 of Figure 1.
Figure 3:
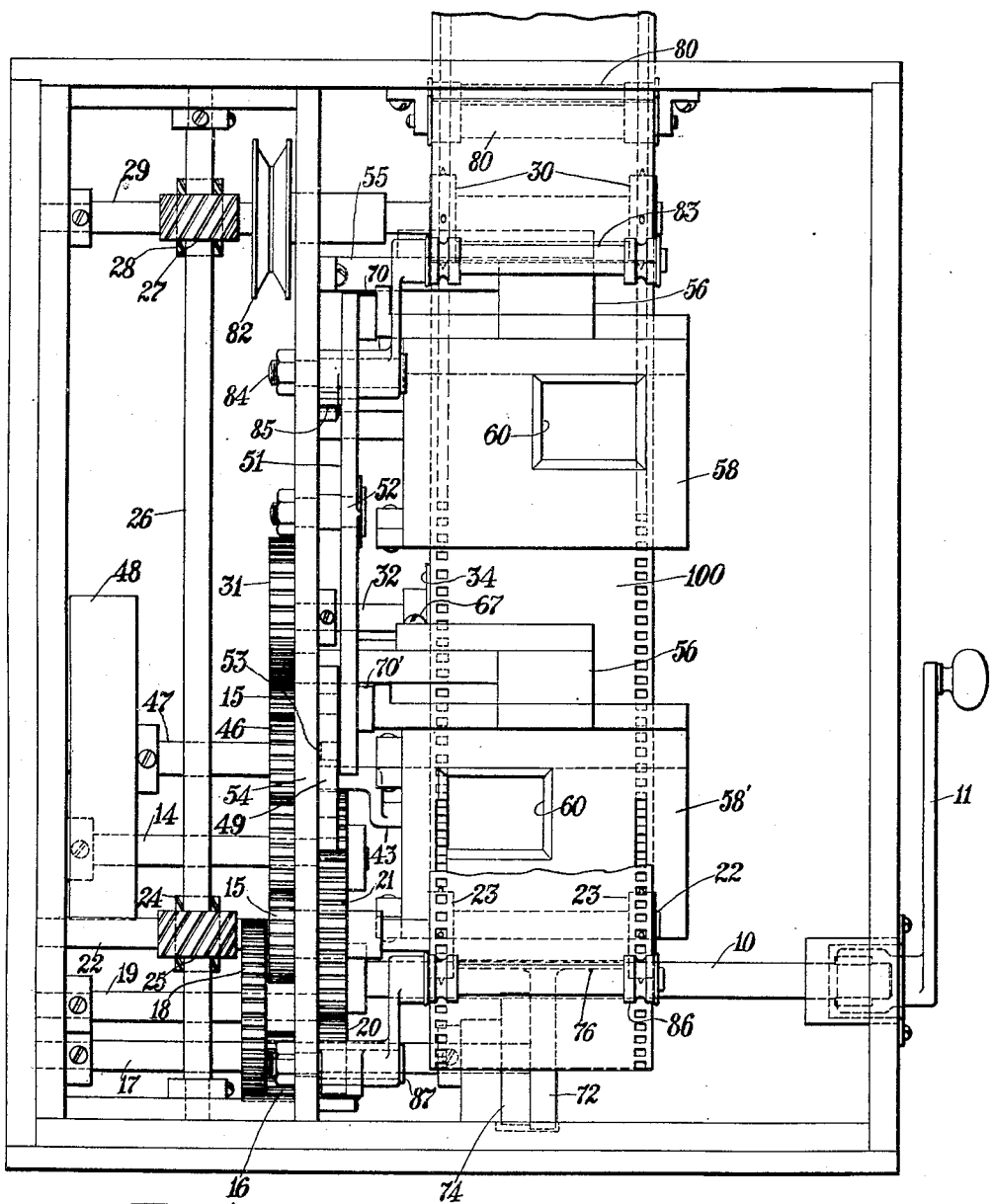
Figure 3 is a rear elevation of Figure 1.
Figure 4:
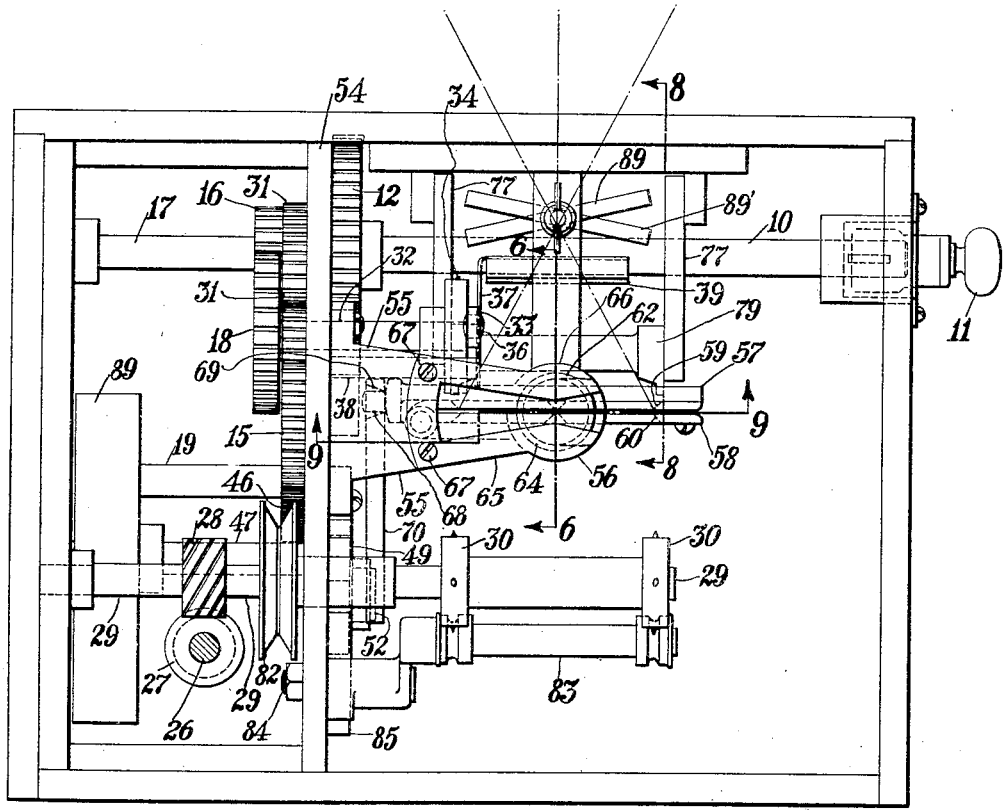
Figure 4 is a top plan view of Figure 1.

The particular form of the device of my invention, shown in the accompanying drawings, comprises a driving shaft 10, to which is attached a handle 11 for ease of operation. Fixedly attached to the shaft 10 is the gear wheel 12. The gear wheel 12 meshes with the gear wheel 13, carried by the shaft 14. The shaft 14 carries also the gear wheel 15, which meshes with the broad gear wheel 16, carried by the shaft 17. The gear wheel 16 meshes with the gear wheel 18, carried by the shaft 19. The shaft 19 carries the gear wheel 20, which meshes with the gear wheel 21, carried by the shaft 22, which also carries the film sprocket wheel 23. The shaft 22 carries the worm gear 24, meshing with the worm gear 25 of the revoluble shaft 26. A second worm gear 27, carried by the shaft 26, meshes with the worm gear 28 of the revoluble shaft 29, which also carries the film sprocket wheel 30. From the above, it will be seen that the revolution of the shaft 10 will revolve the two film sprockets 23 and 30 uniformly with respect to each other.

The gear wheel 15 meshes with the gear wheel 31, carried by the shaft 32. A member 33 is pivotally attached to the member 34, carried by the shaft 32, at 35. The upper extremity of the member 33 is pivotally attached at 36 to the shutter carrying member 37, which is pivotally attached at 38, The member 37 carries the shutter 39, having the slot opening 40. The lower extremity of the member 33 is pivotally attached at 41 to the shutter carrying member 42, which is pivotally attached at 43. The member 42 carries the shutter 44, having the slot opening 45. It is evident, from the above, that the revolution of the shaft 10 will revolve the gears 12, 15 and 31 and the member 34, thus giving the shutters 39 and 44 a simultaneous oscillating movement.

The gear 15 meshes with the gear wheel 46, carried by the shaft 47, which also carries the fly wheel 48 and the annular member 49. The member 49 contains the cam run-way 50. A crank arm 51 is pivotally carried at 52, the lower extremity of the arm 51 carrying a pin, or projection, 53, inserted within the run-way 50 and capable of movement therein upon the revolution of the member 49.

Attached to the wall 54 is a two-armed support 55, terminating in an annular hollow member 56. The support 55 supports a film frame comprising the two parallel spaced member 57 and 58, integral at their one extremity, the other extremity being open, and having the oppositely opposed openings 59 and 60. The member 57 carries the upwardly extended split annular plug, one side having the flange 62, and the other side having the flange 64. The parts 61 and 63 pass through the opening in the portion 56 of the support 55, and the flanges 62 and 64 rest upon the upper portion thereto supporting the entire film frame device and allowing it to revolve therein. The film frame is maintained in position by the members 65 and 66, fixedly attached to the supporting arms 55 by the screw 67. The extremity of the members 57 and 58 carry a pin 68, which enters an opening 69 in the arm 70, which is pivotally attached to the crank arm 51 at 71. A similar film frame device is carried by the wall 54 and is situated below and in vertical plane with the one just described. This second film frame is indicated in prime numerals, shown especially in Figure 1, and is connected to the crank arm 51 by the member 70' and 71'. It is evident from the above that the revolution of the power shaft 10 will rock the crank arm 51 upon its pivot 52 and thus simultaneously give a partial revolution to the two sets of film frames upon their plugs.

An intermittent movement device comprises the arm 72, pivotally attached at 73, the annular member 74, which is fixedly attached to the shaft 17, the other end of the arm 72 being revolubly carried by the pivot 75. The pivot 75 carries the arm 76, 77, the portion 77 being pivotally supported at 78. The portion 76 carries the two extended toothed arms 79, 79, capable of being inserted in the perforations of the film 100.

The revolution of the shaft 10 will, therefore, cause the toothed member 79, 79 to enter the perforations of the film 100 and draw the film downwardly a predetermined distance, whereupon the toothed members are withdrawn from the perforations, allowing the film to remain stationary until the next movement caused by the toothed members 79, 79.

The film 100 passes from the film box (not shown) over the idlers 80, 80, around the sprocket wheel 30, then looped, and further passes between the film frames 57, 58 and 57', 58', then around the sprocket 23, the idlers 81, 81, into the film box (not shown). The film is taken into the last-mentioned film box by means of the revolution of the pulley 82, which may be connected with the wind-up in the film box by means of a cord or belt. The film is maintained against the sprocket 30 by the member 83, pivotal at 84, and actuated by the spring 85. The film is maintained against the sprocket 23 by the member 86, pivotal at 87, and actuated by the spring 88.

Two lenses 89 and 89' have their optical centers in vertical alignment with each other and are so situated that they will be in parallel position to the film frames 57, 58 and 57', 58' respectively, when the film frames are in angular positions with respect to each other, the angle of divergence of the two lenses being such as to simultaneously impress two images of abutting views upon a photographic film within the two film frames, thus producing a combined image of a view having twice the width of that which would be impressed were only one lens employed.

The various elements of my device, as illustrated and described, are so co-ordinated that it operates as follows:—

Figures 5, 6:
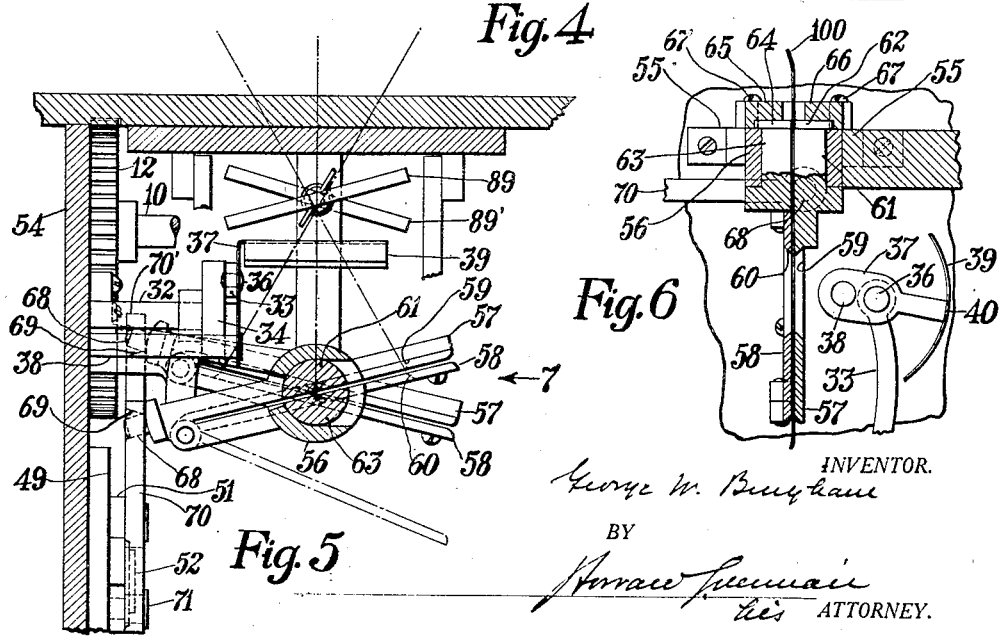
Figure 5 is a section through the line 5—5 of Figure 1.
Figure 6 is a section through the line 6—6 of Figure 4.
Figure 7:
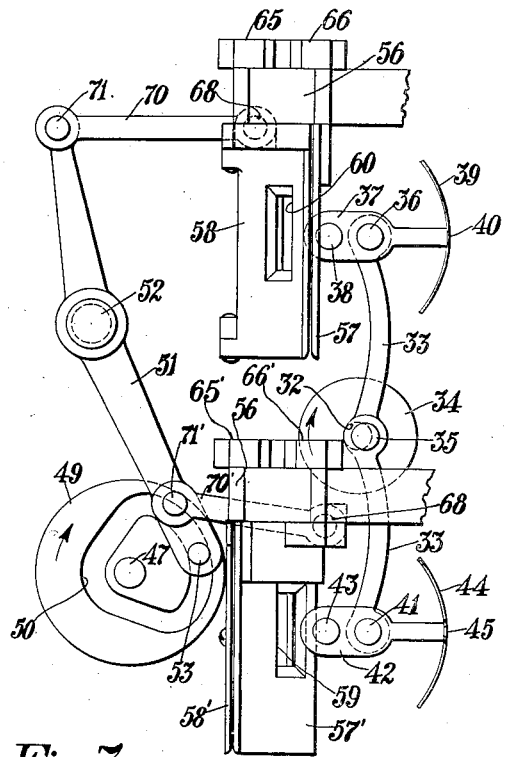
Figure 7 is a view in the direction of the arrow 7 of Figure 5.
Figure 8:
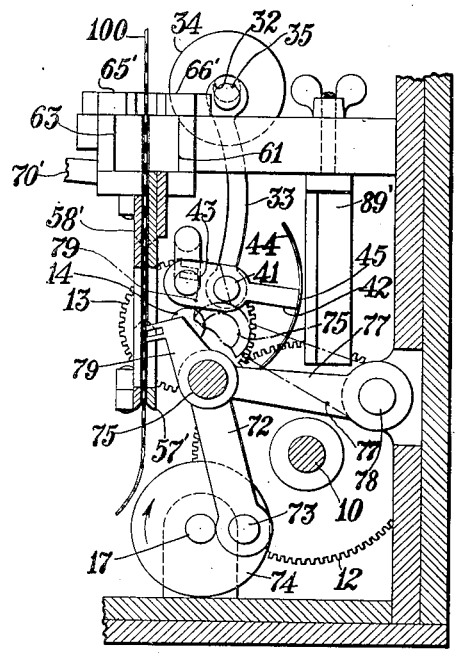
Figure 8 is a section through the line 8—8 of Figure 4.
Figure 9:
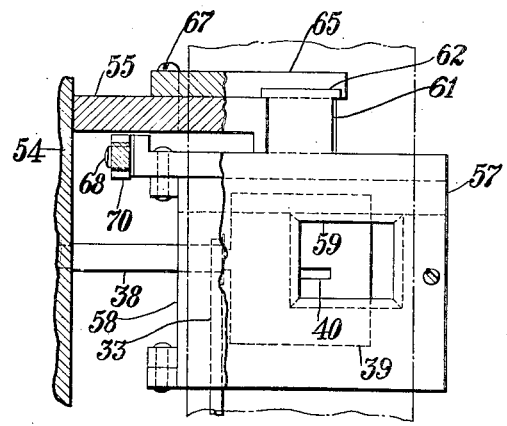
Figure 9 is a section through the line 9—9 of Figure 4.

The film 100, having been introduced, as shown, the lens are uncovered and the handle 11 turned, thus revolving the power shaft 10, which operates through the various mechanisms to produce the following results: The film plates 57, 58 and 57', 58' are revolved into the positions shown particularly in Figures 5 and 7, thus bringing the film 100 in parallel position with respect to the lenses 89 and 89'. When in this position, the shutters 39 and 44 are moved, thus simultaneously allowing the impression of two images upon the film within the two film frames, such images being abutting views. Upon the closing of the shutters, the two film frames are revolved into positions whereby they are in the same plane, as shown particularly in Figures 1, 2, 3, 4, 6 and 8, thus bringing the film into a straight condition, the intermittent movement member 79, 79 is then inserted within the film perforations and the film drawn downwardly, the requisite distance for the next images. The film frames are then revolved into parallel position with the lenses and the photographic operation repeated. During the period of film movement, it is withdrawn from the film box by the sprocket 30, and passes over the sprocket 23, and is taken up within the film box by means of the pulley movement 82.

It will thus be seen that a series of images of abutting views will be impressed upon the film and that such simultaneous images will not be in abutting position with respect to each other upon the film, but will be in stepped relation.

It is evident that a greater number of lenses, than shown in the drawings, may be employed for the production of the series of photographic impressions, thus allowing the photographing of still wider views.

I do not limit myself to the particular size, shape, number or arrangement of parts, as shown and described, all of which may be varied without going beyond the scope of my invention as shown, described and claimed.

What I claim is:—

1. In a motion picture device, in combination, a plurality of divergent lenses having their optical centers in vertical alignment; a revoluble film frame for each lens; means for revolving the film frames into a vertical plane with respect to each other and into parallel positions with respect to their respective lenses; means for intermittently moving a photographic film through the film frames and means for intermittently exposing and obstructing the lenses to light.

2. In a motion picture device, in combination, a plurality of photographic lenses, the optical axes of the lenses diverging outwardly from each other, the optical fields of the lenses covering a complete extended horizontal field view; a revoluble film frame for each lens; means for simultaneously placing the film frames in a vertical plane with respect to each other and for simultaneously placing film frames in parallel position with respect to their lenses; means whereby a film may be moved a predetermined distance through the film frames when they are in the same plane with respect to each other; means whereby the film may be prevented from exposure to light during said movement; means for interrupting the movement of the film when the film frames are in a position parallel to their lenses and means for admitting light through the lenses and upon the film when the film is in its nonmovable position.

3. In a motion picture device, in combination, a plurality of photographic lenses, the optical axes of the lenses diverging outwardly from each other, the optical fields of the lenses covering a complete extended horizontal field view; a movable film frame for each lens; means whereby a film passing through the frames will be intermittently moved and stopped; means for simultaneously moving the frames into a plane parallel with each other, allowing the movement of a film therethrough; means for interrupting the movement of a film while the frames are in positions parallel to their lenses and an intermittent shutter allowing the taking of a plurality of pictures through the film frames upon a film when the film is in a stationary position.

4. In a motion picture device, in combination, a plurality of photographic lenses, the optical centers of the lenses being in vertical alignment with each other; a movable film frame for each lens; means for moving the film frames into a plane parallel with each other and for moving the film frames parallel to their lenses; means whereby a film moving intermittently through the film frames will have a movement while the frames are in a plane parallel to each other and whereby the film will be stationary while the frames are parallel to their lenses, means for exposing the film to light during its stationary period and means for protecting the film from light during its movement.

5. In a motion picture device, in combination, a plurality of photographic lenses, the optical axes of the lenses diverging outwardly from each other, the optical fields of the lenses covering a complete extended horizontal field view; a movable film frame for each lens; means for revolving the film frames into a plane parallel to their respective lenses; means whereby a film within the plurality of film frames will have an intermittent movement and will be moved during the period when the film frames are in a frame parallel to themselves and will be interrupted when the frames are parallel to their lenses and means for exposing film to light during its stationary period and for obstructing the film from light during its moving period.

6. In a motion picture device, in combination, a plurality of photographic lenses, the optical centers of which are in vertical alignment with each other, the optical fields of the lenses covering a complete extended horizontal field view; a movable film frame for each lens; means for revolving the film frames into a plane parallel to their respective lenses; and means so operating with respect to each other that the film will move a predetermined distance while the frames are in a plane with respect to each other, whereby the film movement will be interrupted when the frames are parallel to their lenses and whereby a series of pictures will be taken upon the film in stepped relation to each other during the film stationary period.

7. In a motion picture device, in combination, a plurality of photographic lenses, the optical centers of which are in alignment with each other, the optical axes of the lenses diverging outwardly from each other; a movable film frame for each lens; means for intermittently moving the frames into a plane with respect to each other and for moving them parallel to their respective lenses, the movement of the film being interrupted when the frames are parallel to the lenses and means for taking a plurality of pictures upon a film in stepped relation with each other while the frames are parallel to the lenses.

8. In a motion picture device, in combination, a plurality of lenses in angular position with respect to each other; a movable film frame for each lens; means for moving the film frames into the same plane with respect to each other; means for passing a film through the frames when in the same plane with respect to each other; and means for moving the frames parallel to their respective lenses, bringing the film within each frame perpendicular to the optical axis of its lens.

Signed at New York city, in the county of New York and State of New York, this 8th day of February, 1921.

GEORGE W. BINGHAM.